United States Patent [19]

Baker

[11] 4,270,837
[45] Jun. 2, 1981

[54] PERISCOPIC VIEWFINDER SYSTEM FOR USE IN PHOTOGRAPHIC CAMERAS

[75] Inventor: James G. Baker, Bedford, N.H.

[73] Assignee: Polaroid Corporation, Cambridge, Mass.

[21] Appl. No.: 26,086

[22] Filed: Apr. 2, 1979

[51] Int. Cl.³ .......................................... G03B 13/02
[52] U.S. Cl. ........................................ 350/54; 350/45
[58] Field of Search ............................ 350/45, 55, 189

[56]  References Cited
U.S. PATENT DOCUMENTS

| 3,583,785 | 6/1971 | Boardman | 350/8 |
| 3,722,979 | 3/1973 | Mikami | 350/54 |
| 3,792,650 | 2/1974 | Mueller et al. | 352/171 |

FOREIGN PATENT DOCUMENTS 851592 10/1960 United Kingdom ...................... 350/45

OTHER PUBLICATIONS

Smith, *Modern Optical Engineering*, New York, McGraw-Hill, pp. 212-213, 1966.

Primary Examiner—Edward S. Bauer
Assistant Examiner—Matthew W. Koren
Attorney, Agent, or Firm—Francis J. Caufield

[57]  ABSTRACT

For use in an afocal, periscopic viewfinder system of the type having four spaced apart elements, all equiconvex with aspherized surfaces and identical in pairs, and a central stop, there is provided a novel central reimaging system that is structured to increase the overall length of the viewfinder system without substantially changing the other characteristics or optical performance of the viewfinder system.

14 Claims, 4 Drawing Figures

PERISCOPIC VIEWFINDER SYSTEM FOR USE IN PHOTOGRAPHIC CAMERAS

BACKGROUND OF THE INVENTION

1. Field of the Invention

This invention in general relates to viewfinder systems for use in photographic cameras but, in particular, to an improved, periscopic viewfinder system of the real image type.

2. Description of the Prior Art

The use of through-the-lens reflex viewfinder arrangements in motion picture cameras is well known. Such arrangements are advantageous because the viewfinder automatically shows the correct field of view irrespective of the focal length of the lens used (especially useful with zoom lenses) and makes visual focusing of the image possible. Commonly, a beamsplitter or small pick-off mirror is positioned in the optical path to direct a percentage of the image forming rays into the viewfinder system which thereafter operates to provide the photographer with a well-defined, usually rectangular, erect image field equal to that covered by the camera lens.

Generally, such viewfinder arrangements extend along one side of the camera from front to back and, as such, usually comprise a periscopic system which classically consists of an objective, an eyelens or eyepiece and one or more field and erector lenses arranged between the objective and eyelens to extend the length of the system or to erect the image or both.

More recently, periscopic viewfinder systems have been disclosed which require fewer optical elements than the classical field/relay lens arrangements. The more recent periscopic arrangements eliminate elements by arranging non-spherical elements so that each element performs in part as both objective lens and field lens.

Examples of the more recent type of periscopic viewfinder systems are shown, e.g., in U.S. Pat. No. 3,583,785 issued to Jack B. Boardman on June 8, 1971 and entitled "Positive Optical System"; U.S. Pat. No. 3,722,979 issued to Nobunao Mikami on Mar. 27, 1973 and entitled "Optical System of the Real Image Type for Finders Having Aspheric Surfaces"; and U.S. Pat. No. 3,792,650 issued to Arthur C. Mueller et al. on Feb. 19, 1974 and entitled "Camera Focus Indicia System."

It is a primary object of the present invention to provide an improved periscopic viewfinder of the more recent type, supra, for use in a photographic camera.

Other objects of the invention in part will be obvious and in part will appear hereinafter. The invention accordingly comprises the apparatus possessing the construction, combination of elements, and arrangement of parts which are exemplified in the following detailed disclosure.

SUMMARY OF THE INVENTION

This invention in general relates to periscopic viewfinder systems suitable for use in photographic cameras but in particular to an improvement in the form of a central reimaging optical system for use in a periscopic viewfinder system of the type including four elements, all equi-convex, aspheric, and identical in pairs, and a central stop wherein the elements are optically structured to perform both objective lens action and field lens action and in combination produce a usable final erect image with an accessible exit pupil.

The central reimaging system is structured to increase the overall length of the improved viewfinder system without substantially changing the original characteristics or optical performance of the unimproved viewfinder system and comprises a first negative lens element associated with the second element of the unimproved viewfinder system first pair of identical equi-convex elements. The first negative lens element is s structured so that the net power of the combination of the first negative lens element and the second element of the unimproved viewfinder first identical pair of equi-convex elements is reduced.

Also included is a second negative lens element associated with the first element of the unimproved viewfinder system second pair of identical equi-convex elements. The second negative lens element is structured so that the net power of the combination of the second negative lens element and the first element of the unimproved viewfinder system second identical pair of equi-convex elements is reduced whereby the spacing between the improved viewfinder pairs of equi-convex elements is increased. The focal length of the first and second negative lens elements is selected so that the entrance and the exit pupils of the improved viewfinder system remain substantially unchanged compared with the unimproved viewfinder system.

Also provided are a pair of central positive elements equally spaced on either side of the improved viewfinder central stop and structured to reimage image bearing rays over the increased spacing separating the viewfinder pairs of equi-convex elements in the lengthened, improved viewfinder system. The net power of the central positive elements is chosen so as not to exceed four times the inverted distance separating the second element and the first element respectively of the improved viewfinder pairs of equi-convex elements.

DESCRIPTION OF THE DRAWINGS

The novel features that are considered characteristic of the invention are set forth with particularity in the appended claims. The invention itself, however, both as to its organization and method of operation together with other objects and advantages thereof will best be understood from the following description of the illustrated embodiment when read in connection with the accompanying drawings wherein like numbers have been employed in the different figures to denote the same parts and wherein:

DESCRIPTION OF THE PREFERRED EMBODIMENT

Figure 1:
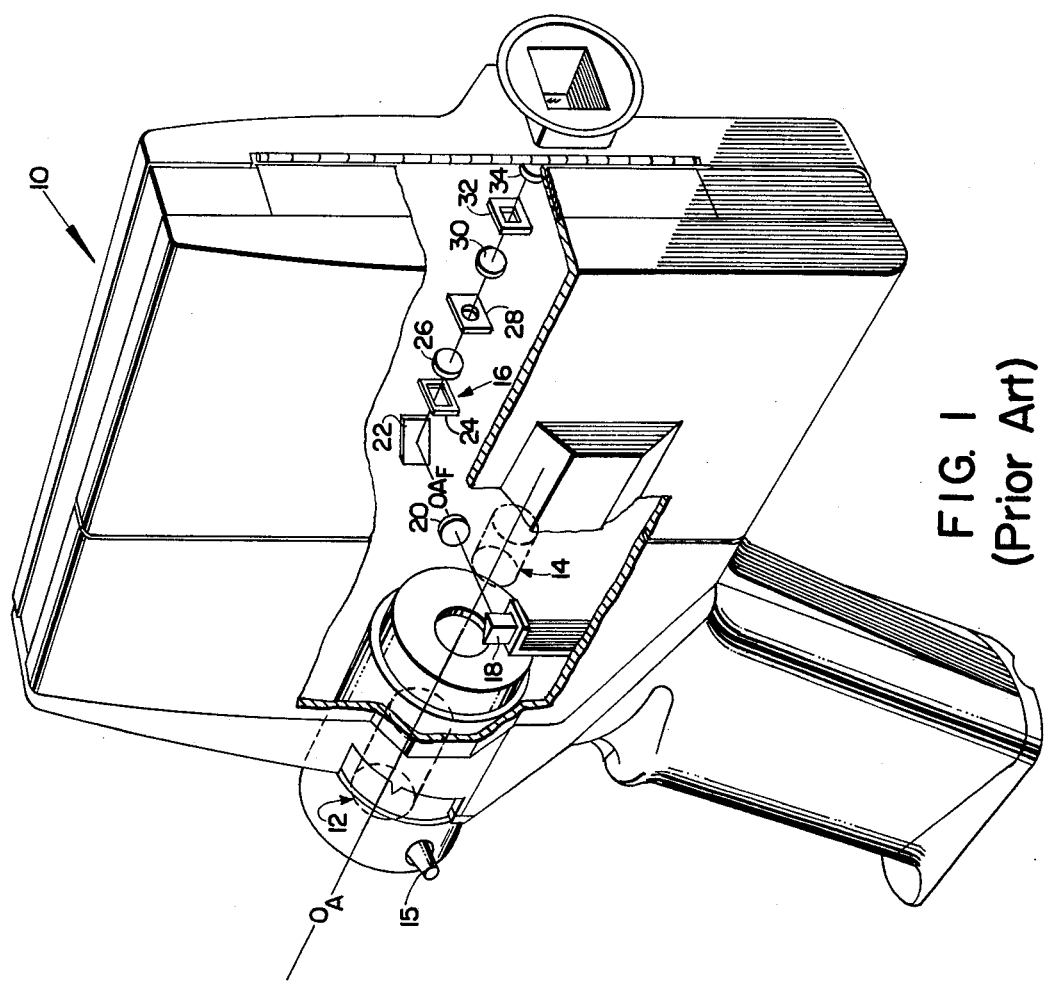
FIG. 1 is a perspective view, with parts broken away, of a motion picture camera representative of the prior art.

Referring now to FIG. 1, there is shown a motion picture camera 10 which includes a well-known periscopic viewfinder system generally designated at 16. Both the camera 10 and the viewfinder system 16 are representative of the prior art and are included here to illustrate certain features of each with which the improved periscopic viewfinder of the present invention cooperate in a manner to be described.

The motion picture camera 10 may be any of a number of well-known types but, as illustrated, represents Polaroid Corporation's Polavision Camera which is adapted in a well-known manner to accept instant color motion picture film which can be processed and viewed via a player (not shown) immediately after it has been exposed. The camera 10 has an objective optical system which comprises a well-known prime lens designated schematically at 14 and a well-known afocal zoom lens designated schematically at 12. The f-number of the camera 10 is 1.8 and the zoom ratio of the zoom lens 12 is 2:1. Also provided, but not shown, is a two position switch to allow selection between near and far focus ranges, the near focus being set between 6 and 15 feet and the far focus between 15 feet and infinity. The zoom section 12 of the camera objective optical system is adjusted in a well-known manner by rotation of a lens barrel 15.

The viewfinder system 16 comprises a pick off mirror 18 which is located between the zoom lens 12 and the prime lens 14 and slightly off the optical axis, OA, of the camera objective optical system. The pick off mirror 18, which may be a small prism, serves as an entrance window being more or less centrally located in the beam from the rear surface of the preceding zoom lens 12 prior to the passage of the beam into and through the prime lens 14 which forms the final image on the film. The pick off mirror 18, however, is a good deal smaller than the cross-section of the beam needed for forming the ultimate photographic image and therefore subtracts only a small portion of the useful image forming light. A 45° beamsplitter (or prism) could also be used instead of the pick off mirror 18 and would be effective. The pick off mirror 18 functions to deflect light through a 90° angle to the remaining essential optical components of the viewfinder system 16 which comprise from front to rear along a folded optical axis, $OA_F$, of the viewfinder system 16 a first equi-convex lens element 20, a plano mirror 22 which folds the optical path, $OA_F$, through 90°, a second equi-convex lens element 26 which is identical to the first lens element 20, and third and fourth equi-convex lens elements, 30 and 34, respectively which form a second identical lens pair in the optical train of the viewfinder system 16. All of the lens elements, 20, 26, 30 and 34, have aspheric surfaces superimposed over their basic radii. The aspheric term which is superimposed on both sides of the lens elements 20 and 26 is identical for those elements but of opposite sign on oppositely facing surfaces thereof while the aspheric term superimposed on the surfaces of the lens elements 30 and 34 are identical for this latter pair of elements but opposite for oppositely facing surfaces thereof and different from the aspheric term superimposed on the surfaces of the lens elements 20 and 26.

Located between the lens elements 26 and 30 is a central real stop 28 which serves as the aperture stop of the viewfinder system 16.

In the foregoing manner, the viewfinder system 16 is provided with four elements, all equi-convex, aspheric, and identical in pairs and a central aperture stop.

Between the plano mirror 22 and the lens element 26 there is provided a field stop 24 which functions at its location to limit unwanted light from entering the viewfinder system 16 to prevent loss of contrast and glare, and between the lens element 30 and the lens element 34, there is provided a field stop 32 which functions to provide a rectangular field mask.

The detailed characteristics of the viewfinder system 16, such as radii, aspheric terms, thicknesses, indices of refraction, Abbe V-number, thicknesses and spacings are substantially identical to those given in the previously referenced U.S. Pat. No. 3,583,785.

Figure 2:
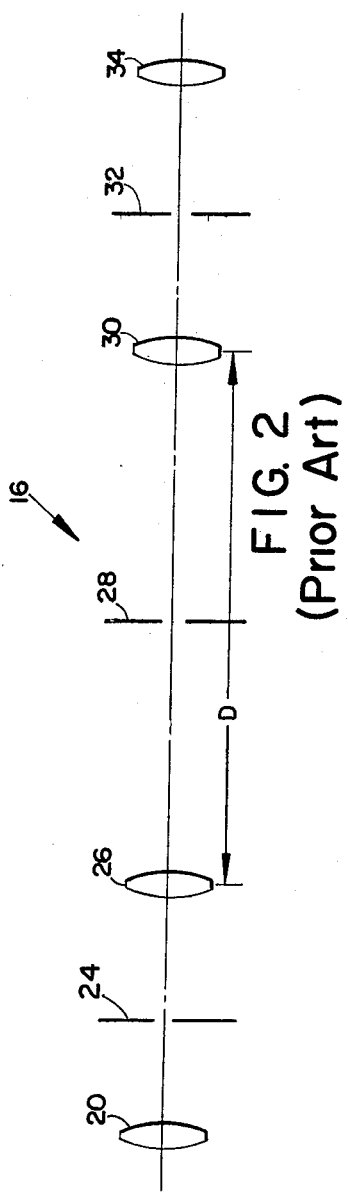
FIG. 2 is an unfolded, side-elevational view of a well-known viewfinder system incorporated in the camera of FIG. 1 and representative of the prior art.

The optical function of the viewfinder system 16 begins with the first equi-convex lens element 20 which accepts parallel light from the small pick off mirror or prism 18 and focuses thereafter a first conjugate image onto the field stop 24 which is located at the focal point of the lens element 20 (see FIG. 2). The second equi-convex lens element 26, which in this instance is identical to the first equi-convex lens element 20, performs the dual role of field lens and objective lens. This second equi-convex element 26, teaming up with the first 20, together form a real image of the entrance window (pick off mirror 18) at the real stop 28 which lies intermediate the second element 26 and the third element 30. The aperture stop 28 defines the actual bundle of rays used in the entire viewfinder system 16.

Principal or chief rays in object space, passing through the axial point of the entrance pick off mirror 18, by imaging through the first two elements, 20 and 26, are focused onto the axial point of the intermediate real stop 28. This axial point defines the axial location of the plane of the real stop 28. The overall refraction of the principal rays can be thought of as the field-lens action of the first pair of elements 20 and 26. Thus, the principal rays are controlled and are redirected in a useful manner.

The first two lens elements, 20 and 26, also perform together an objective lens task in that the rays diverging from the first conjugate image at field stop 24 are more or less recollimated by the second lens 26 of the pair. Pure collimation would have them parallel, but this is not essential since the overall viewfinder system 16 is not precisely symmetrical.

The combination of the second and third equi-convex elements, 26 and 30, work together to reimage the first conjugate image onto a second image plane lying between the third and fourth elements, 30 and 34 respectively, at the field stop 32. The second element 26 and the third element 30 therefore perform an objective lens function in that image forming rays are collected and refocused. The image in the second conjugate image plane at the field stop 32 is properly erect and suitable for use with the fourth element 34 which acts as a simple magnifier to provide the eye with more or less collimated rays for easy viewing.

The combination of the third element 30 and the fourth element 34, both equi-convex, and identical, performs a field lens action in that the principal rays from the intermediate stop 28 are refocused onto the exit pupil of the viewfinder system 16—that is—they form the exit pupil in an accessible location in image space for use with the eye.

The fourth element 34, by itself, performs an objective lens action in that image-forming rays arising from the second conjugate image plane at the field stop 32 are recollimated for the eye. The image of the intermediate aperture stop 28 in final image space is used by the eye of the observer, defines the final exit pupil of the viewfinder system 16 and is where the observer places the entrance pupil of his eye for maximum access to the full field of view.

Structured in the foregoing manner, the viewfinder system 16 operates to provide the eye with a well-defined rectangular field stop, an erect image field equal to that covered by the camera lens, unit optical power, and an accessible eye relief.

Figure 3:
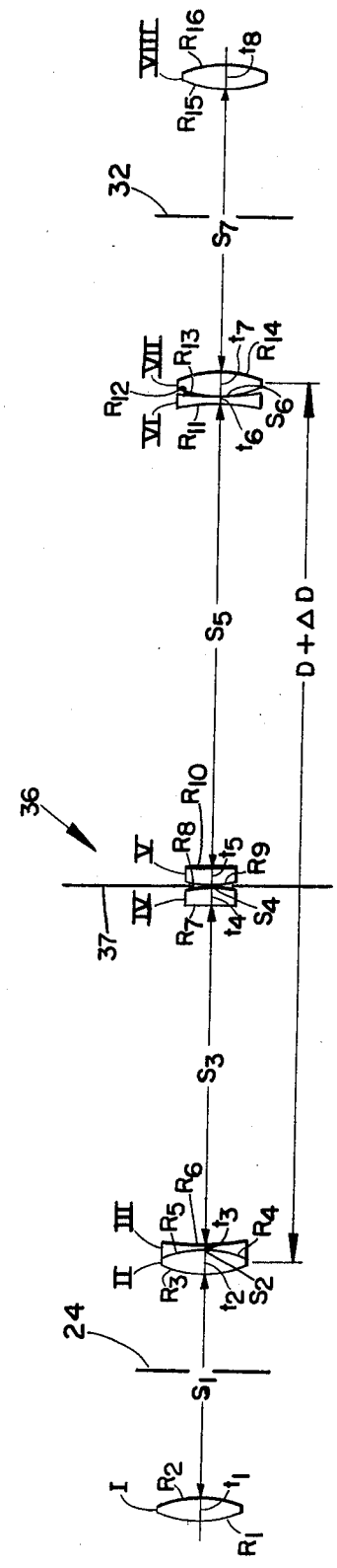
FIG. 3 is a side-elevational view of the improved viewfinder system of the invention.

Referring now to FIG. 3, there is shown, designated at 36, the improved periscopic viewfinder system of the present invention. The design parameters for the viewfinder system 36 are given in the table below with reference to FIG. 3.

| Lens | $n_d$ | V | Material | Radii | Thickness |
|---|---|---|---|---|---|
| I | 1.4917 | 57.2 | Methacrylate | $R_1 = .6087$ | $t_1 = 0.12$ |
|   |        |      |              | $R_2 = -.6087$ | $s_1 = 1.213$ |
| II | 1.4917 | 57.2 | Methacrylate | $R_3 = .6087$ | $t_2 = 0.12$ |
|    |        |      |              | $R_4 = -.6087$ | $s_2 = .002$ |
| III | 1.5168 | 64.2 | Borosilicate | $R_5 = -.6087$ | $t_3 = 0.03$ |
|     |        |      |              | $R_6 = 2.7568$ | $s_3 = 1.8161$ |
| IV | 1.5168 | 64.2 | Borosilicate | $R_7 = -2.0728$ | $t_4 = 0.10$ |
|    |        |      |              | $R_8 = -1.3507$ | $s_4 = .010$ |
| V | 1.5168 | 64.2 | Borosilicate | $R_9 = 1.2269$ | $t_5 = 0.10$ |
|   |        |      |              | $R_{10} = -12.6178$ | $s_5 = 2.4909$ |
| VI | 1.5168 | 64.2 | Borosilicate | $R_{11} = -.8671$ | $t_6 = 0.030$ |
|    |        |      |              | $R_{12} = 2.645$ | $s_6 = .002$ |
| VII | 1.4917 | 57.2 | Methacrylate | $R_{13} = .807$ | $t_7 = 0.12$ |
|     |        |      |              | $R_{14} = -.807$ | $s_7 = 1.5356$ |
| VIII | 1.4917 | 57.2 | Methacrylate | $R_{15} = .807$ | $t_8 = 0.12$ |
|      |        |      |              | $R_{16} = -.807$ |   |

In the above table the Roman numerals refer to the lens element shown in FIG. 3 from front to rear; $n_d$ is the refractive index; V is the Abbe number; $R_1$, $R_2$ . . . represent radii of successive refractive surfaces from front to rear; t and s represent thickness of lens elements and air spaces, respectively. The lens elements I and II have an aspheric term $A = -1.0$ superimposed on the basic radius of their respective surfaces given in the table above but of opposite sign on oppositely facing surfaces; and the elements VII and VIII have an aspheric term $A = -0.405$ superimposed on the basic radius of their respective surfaces given on the above table but of opposite sign on oppositely facing surfaces wherein the aspheric term is derived by the formula:

$$Z = R - R\sqrt{1 - \frac{H^2}{R^2} - \frac{2AH^4}{R}}$$

where R is the radius of the surface of the element, H and Z are respectively the vertical and horizontal Cartesian coordinates of a point on the surface.

The elements I and II are identical to one another and generally to the elements 20 and 26 of the viewing system 16 which is described in U.S. Pat. No. 3,583,785 referenced previously and, in like manner, the elements VII and VIII are identical to one another and substantially identical to the elements 30 and 34 of the viewfinder system 16 which are also described in the U.S. Pat. No. 3,583,785.

The improvement of the viewfinder system 36 over the prior art resides in the addition of a central reimaging section which comprises the lens elements, III, IV, V and VI, which operate to permit the spacing, D, (see FIG. 2) between the lens elements 26 and 30 to be increased in such a manner that the original characteristics and performance of the viewfinder system 16 remain substantially unchanged while its overall length is substantially increased.

The lens element III is preferably cemented to the lens element II and is structured so that the net power of the combination of the lens elements II and III is reduced. The second negative lens element, VI, of the central reimaging system of the improved viewfinder system 36 is structured so that the net power of the combination of the lens elements VI and VII is also reduced whereby the spacing between the identical equi-convex pairs of lens elements of the improved viewfinder system 36 can be increased compared with the original spacing between those pairs as illustrated in FIG. 2.

The focal length of the lens elements III and VI is selected so that the entrance and exit pupils of the improved viewfinder system 36 remain substantially unchanged compared with the unimproved viewfinder system 16.

The central pair of positive elements, IV and V, are preferably located adjacent and on opposite sides of a real central aperture stop 37 and are structured to reimage image bearing rays over the increased spacing $D + \Delta D$ (FIG. 3) separating the equi-convex pairs of lens elements of the improved viewfinder system 36. As a result of this, the net power of the central positive elements, IV and V, does not exceed four times the inverted distance, $D + \Delta D$, separating element II from element VII.

The diameter of the central stop 37 for the example given is larger than the diameter of the central stop 28 by a factor of approximately 2.5, and the negative lens element VI has been bent for the purpose of favorably correcting for coma and astigmatism.

As shown in FIG. 3, the intermediate or central aperture stop 37 is located between the central elements, IV and V. The net power of the central elements, IV and V, can vary from 0 as for the case of the prior art viewfinder system 16 to such a value as to not to exceed four times the inverted distance $(D + \Delta D)$ between the field lens groups in the drawing of FIG. 3. This range is based on the fact that a simple positive element used at 1:1 conjugates produces a separation between the conjugates of four times its focal length. Conversely, the focal length of a simple element is one-fourth of the overall separation of conjugate planes at 1:1. Inasmuch as some of the reimaging action is performed by the second and third elements, II, VII (elements 26 and 30 of the prior art viewfinder system 16) as modified by associated elements, III, IV, V and VI, the central elements (IV and V) added are not quite as strong as if the entire work were performed by them solely. Accordingly, the net power of the elements IV and V cannot exceed four times the inverted separation $(D + \Delta D)$ where $1/f$ is called the power when f is the focal length. If the overall separation is $(D + \Delta D)$, the focal length f exceeds $(D + \Delta D)/4$.

The overall length of the improved viewfinder system 36 has been, by way of the central reimaging system of the invention, increased by approximately 3.25 inches thus permitting the rear wall of the camera 10 to be rearwardly moved for the purpose of adding additional components to the camera 10.

Figure 4:
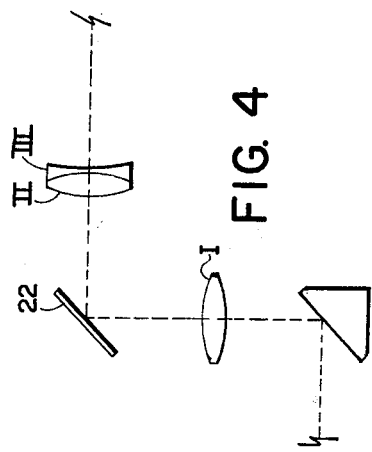
FIG. 4 is a side-elevational view of a part of the viewfinder system of FIG. 3 arranged for reflex viewing.

Referring now to FIG. 4, there is shown an arrangement by which the improved viewfinder system 36 can be adapted for use in a reflex viewing mode in a camera such as 10. As with the viewfinder system 16, the pick off mirror 18 operates to divert part of the image forming rays from the zoom lens 12 through an angle of 90°. The lens element I is placed in the ray path from the pick off mirror 18 and the rays emerging from the lens element I are diverted through a 90° angle by the 45° plano mirror 22 which directs them toward the cemented elements II and III.

Those skilled in the optical arts will appreciate that the improved, lengthened viewfinder system 36 is advantageously structured to utilize existing elements of the unimproved viewfinder system 16 therefore making it quite easy during fabrication operations to convert from the manufacture of one to the other since certain parts are common to both.

Certain changes may be made in the above-described embodiment without departing from the scope of the invention, and those skilled in the art may make still other changes according to the teachings of the disclosure. Therefore, it is intended that all matter contained in the above description or shown in the accompanying drawings shall be interpreted as illustrative and not in a limiting sense.

What is claimed is:

1. An afocal, elongated viewfinder optical system for use in a photographic camera to provide a final erect image of a scene at an accessible exit pupil, said viewfinder system comprising:
    a first pair of equi-convex, aspheric lens elements structured to provide both an objective lens function and a field lens function;
    a second pair of equi-convex aspheric lens elements also structured to provide both an objective lens function and a field lens function, the second lens element of said first pair of equi-convex lens elements being spaced from the first lens element of said second pair of equi-convex lens elements by a predetermined distance;
    a central aperture stop located between said first and second pairs of equi-convex lens elements;
    a first negative lens element associated with said second element of said first pair of equi-convex lens elements and structured so that the net focal length of the combination of said first negative lens element and said second element of said first pair of equi-convex lens elements is increased, said first pair of equi-convex lens elements in combination with said first negative lens element operating to provide an image of said central aperture stop in object space, said central aperture stop image defining the entrance pupil to said viewfinder system;
    a second negative lens element associated with the first element of said second pair of equi-convex lens elements and structured so that the net focal length of the combination of said second negative lens element and said first lens element of said second pair of equi-convex lens elements is increased, said second pair of equi-convex lens elements in combination with said second negative lens element operating to provide an image of said central aperture stop in image space which image defines the exit pupil of said viewfinder system; and
    central positive lens means located adjacent said central aperture stop and structured to reimage image bearing rays over said predetermined distance separating said first and second pairs of equi-convex lens elements, the focal length of said central positive lens means exceeding one-fourth said predetermined distance separating said first and second pairs of equi-convex lens elements, said first and second pairs of equi-convex lens elements, said first and second negative lens elements, and said positive lens means being further structured to optically cooperate to provide the final erect scene image at said exit pupil of said viewfinder system.

2. The viewfinder system of claim 1 wherein said first negative element is cemented to the rear surface of said second element of the viewfinder system first pair of equi-convex elements.

3. The viewfinder system of claim 2 wherein said second negative element is bent for the purpose of favorably correcting for coma and astigmatism.

4. The viewfinder system of claim 1 wherein said central positive lens means comprises a pair of positive lens elements equally spaced on either side of said viewfinder central stop wherein said positive lens elements are structured so that net focal length of said pair of positive lens elements equals the focal length of said central positive lens means.

5. The viewfinder system of claim 4 wherein said central pair of positive lens elements are arranged immediately adjacent either side of said central aperture stop.

6. In combination with a periscopic viewfinder system of the type including, along an optical path thereof, a first pair of equi-convex lens elements, a central stop, and a second pair of equi-convex lens elements wherein the second lens element and the first lens element of the first and second pairs of equi-convex lens elements respectively are separated by a predetermined spacing and wherein all the elements are structured to provide both an objective lens function and a field lens function to in combination produce a final erect image with an accessible exit pupil, an improvement by which the overall length of the viewfinder optical path can be increased by increasing the spacing separating the first and second pair of equi-convex lens elements to a predetermined distance without otherwise changing the optical characteristics and performance of the viewfinder system, said improvement comprising:
    a first negative lens element associated with the second element of the viewfinder system first pair of identical equi-convex elements and structured so that the net focal length of the combination of said first negative lens element and the second element of the viewfinder first identical pair of equi-convex elements is increased;
    a second negative lens element associated with the first element of the viewfinder system second pair of identical equi-convex elements and structured so that the net focal length of the combination of said second negative lens element and the first element of the viewfinder system second identical pair of equi-convex elements is increased, the focal length of said first and second negative lens elements being selected so that the entrance and exit pupils of the improved viewfinder system remain substantially unchanged compared with the unimproved viewfinder system; and
    central positive lens means located adjacent the viewfinder central stop and structured to reimage image bearing rays over the increased distance separating the viewfinder pairs of equi-convex elements, the focal length of said central positive lens means exceeding one-fourth the predetermined distance separating the second element and the first element respectively of the viewfinder pairs of equi-convex elements.

7. The improved system of claim 6 wherein said first negative element is cemented to the rear surface of the second element of the viewfinder system first pair of equi-convex elements.

8. The improved system of claim 7 wherein said second negative element is bent for the purpose of favorably correcting for coma and astigmatism.

9. The improved system of claim 6 wherein said central positive lens means comprises a pair of positive lens elements equally spaced on either side of the viewfinder central stop wherein said positive lens elements are structured so that net focal length of said pair of positive lens elements equals the focal length of said central positive lens means.

10. The improved system of claim 9 wherein said central pair of positive lens elements are arranged immediately adjacent either side of the central stop.

11. A periscopic viewfinder optical system for use in a photographic camera, said optical system having the following characteristics:

| Lens | $n_d$ | V | Material | Radii | Thickness |
|------|-------|------|--------------|-----------------|-------------|
| I    | 1.4917 | 57.2 | Methacrylate | $R_1=.6087$     | $t_1=0.12$  |
|      |        |      |              | $R_2=-.6087$    | $s_1=1.213$ |
| II   | 1.4917 | 57.2 | Methacrylate | $R_3=.6087$     | $t_2=0.12$  |
|      |        |      |              | $R_4=-.6087$    | $s_2=.002$  |
| III  | 1.5168 | 64.2 | Borosilicate | $R_5=-.6087$    | $t_3=0.03$  |
|      |        |      |              | $R_6=2.7568$    | $s_3=1.8161$|
| IV   | 1.5168 | 64.2 | Borosilicate | $R_7=-2.0728$   | $t_4=0.10$  |
|      |        |      |              | $R_8=-1.3507$   | $s_4=.010$  |
| V    | 1.5168 | 64.2 | Borosilicate | $R_9=1.2269$    | $t_5=0.10$  |
|      |        |      |              | $R_{10}=-12.6178$ | $s_5=2.4909$|
| VI   | 1.5168 | 64.2 | Borosilicate | $R_{11}=-.8671$ | $t_6=0.030$ |
|      |        |      |              | $R_{12}=2.645$  | $s_6=.002$  |
| VII  | 1.4917 | 57.2 | Methacrylate | $R_{13}=.807$   | $t_7=0.12$  |
|      |        |      |              | $R_{14}=-.807$  | $s_7=1.5356$|
| VIII | 1.4917 | 57.2 | Methacrylate | $R_{15}=.807$   | $t_8=0.12$  |
|      |        |      |              | $R_{16}=-.807$  |             | wherein Roman numerals identify lens elements from front to rear; $n_d$ is the refractive index; V is the Abbe number; $R_1$, $R_2$ ... represent radii of successive refractive surfaces from front to rear; t and s represent thickness of lens elements and air spaces, respectively; elements I and II have an aspheric term $A=-1.0$ superimposed on the basic radius of their respective surfaces given above but of opposite sign on opposing surfaces; and elements VII and VIII have an aspheric term $A=-0.405$ superimposed on the basic radius of their respective surfaces given above but of opposite sign on opposing surfaces wherein the aspheric term is derived by the formula:

$$Z = R - R\sqrt{1 - \frac{H^2}{R^2} - \frac{2AH^4}{R}}$$

where R is the radius of the surface of the element, H and Z are respectively the vertical and horizontal Cartesian coordinates of a point on the surface.

12. The viewfinder system of claim 11 wherein said first negative element is cemented to the rear surface of the second element of the viewfinder system first pair of elements.

13. The viewfinder system of claim 12 wherein said second negative element is bent for the purpose of favorably correcting for coma and astigmatism.

14. The viewfinder system of claim 13 wherein said central pair of positive lens elements are arranged on either side of the central stop.

* * * * *